March 8, 1927.
J. MALLIGAN
TRANSMISSION BAND
Filed April 15, 1926
1,619,983
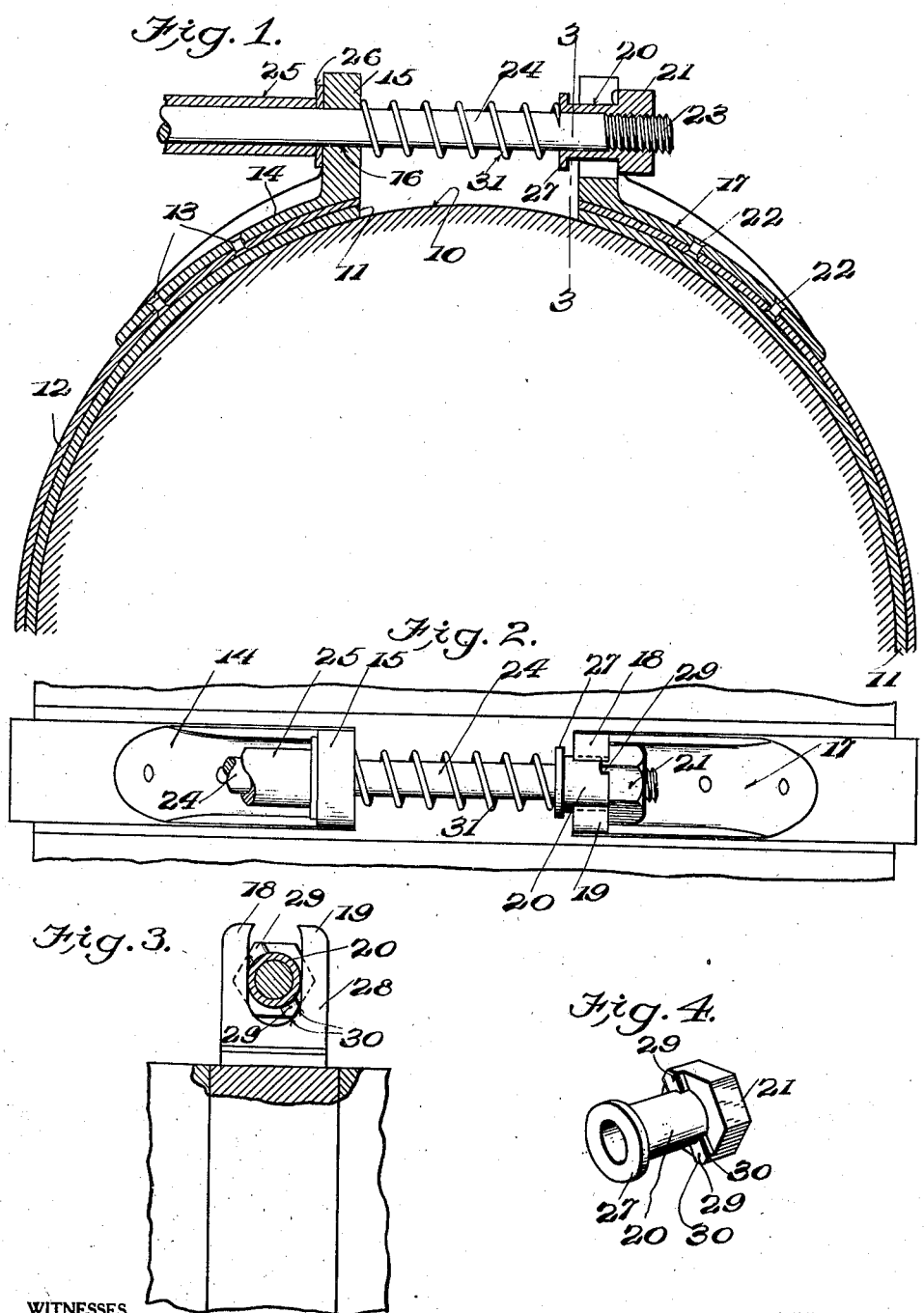
WITNESSES
H. A. LaClair
Harry B. Seidel
INVENTOR
Joseph Malligan
BY
ATTORNEYS Patented Mar. 8, 1927.

1,619,983

UNITED STATES PATENT OFFICE.

JOSEPH MALLIGAN, OF POINT MARION, PENNSYLVANIA.

TRANSMISSION BAND.

Application filed April 15, 1926. Serial No. 102,336.

This invention relates to brake bands for the well known Ford automobiles.

An object of the invention is the provision of a brake band having lugs for supporting the clamping bolt and in which a nut is threaded onto the end of the bolt and having means for maintaining the bolt against rotation.

A further object of the invention is the provision of a brake band having a slotted lug to receive a rotatable nut, with ribs on the nut cooperating with the walls of the slot to prevent unauthorized turning of the nut.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a vertical section of a brake band showing my invention applied thereto.

Figure 2 is a plan view of the adjusting rod and the lugs of the band.

Figure 3 is a vertical section taken along the line 3—3 of Figure 1.

Figure 4 is a view in perspective of the locking nut for the adjusting rod.

Referring more particularly to the drawings, 10 designates a brake drum which is embraced by means of a liner 11 of a metal brake band 12. To one end of the brake band 12 is secured, by means of rivets 13, a plate 14 which carries an upstanding lug 15. This lug is provided with a passage 16 for a purpose which will be presently explained.

To the other end of the brake band is secured a plate 17 having a pair of integrally formed upstanding lugs 18 and 19 which are spaced from each other sufficiently to receive a sleeve 20 on a nut 21. The plate 17 is riveted as shown at 22 to an end of the brake band 12.

The internal surface of the sleeve 20 is not provided with threads and only the nut portion 21 has threads which are adapted to engage threads 23 on an adjusting rod 24. This rod extends through the opening 16 in the lug 15 and is received by a sleeve 25. A washer 26 is located between the inner end of the sleeve and the lug 15.

The outer free end of the sleeve 20 has a flange 27 which is adapted to abut the inner faces 28 of the lugs 18 and 19 and since the nut 21 is of greater diameter than the length of the space between said lugs, the nut will be prevented from displacement from the lugs. The inner face of the nut 21 is provided with a pair of ribs 29 which are adapted to be engaged between the inner side edges of the lugs 18 and 19 and prevent turning of the nut. The ends of the ribs are sheared off at angles as shown at 30.

A coil spring 31 embraces the adjusting rod 24 and has one end abutting the lug 15 with the other end engaging the flange 27 of the sleeve 20.

The sleeve 20 forms a bearing when the nut 21 is rotated and when the lugs 15 and the spaced lugs 18 and 19 are held in spaced relation. It will be appreciated that in the usual practice of applying the bolt, the lugs are held by a tool for maintaining the ends of the band in proper position while adjusting the usual nut. However, the ribs 29 are rounded so that when sufficient pressure is applied to the nut for rotating the same, these ribs will tend to move outwardly of the slot formed by lugs 18 and 19 to permit rotation of the nut. These ribs, nevertheless, have sufficient bearing against the inner face of the lugs 18 and 19 to prevent accidental rotation of the nut due to vibration of the engine when the automobile is travelling. Referring more particularly to Fig. 1 it will be noted that the nut has been screwed up to the limit of movement, however, the threads 23 on the end of the rod 24 may extend along the rod a sufficient distance to permit a wide range of adjustment of the nut on the rod. Furthermore, it is the custom in screwing up the nut on the rod 24 to turn it sufficiently so that the brake band may be properly applied to the drum 10. As the brake band wears the nut is adjusted as has been described, until it is necessary to replace the worn out bands.

What I claim is:

1. A brake band comprising a split annular metal member, a lug secured to each end of the member, one of the lugs being provided with a perforation, an adjusting rod slidable in said perforation, the lug on the other end of the band being slotted, a nut having a sleeve received by the rod, the nut being threaded onto the adjusting rod.

2. A brake band comprising a split annular metal member, a lug secured to each end of the member, one of the lugs being provided with a perforation, an adjusting rod slidable in said perforation, the lug on the other end of the band being slotted, a nut having a sleeve received by the rod, the nut being threaded onto the adjusting rod, and ribs on the nut adapted to be received within the slotted portion of the lug.

3. A brake band comprising a split annular metal member, a lug secured to each end of the member, one of the lugs being provided with a perforation, an adjusting rod slidable in said perforation, the lug on the other end of the band being slotted, a nut having a sleeve received by the rod, the nut being threaded onto the adjusting rod, said sleeve having a flange at its free end, the nut and the flange being of greater diameter than the width of the slot in the lug to prevent displacement of the nut from said slot.

4. A brake band comprising a split annular metal member, a lug secured to each end of the member, one of the lugs being provided with a perforation, an adjusting rod slidable in said perforation, the lug on the other end of the band being slotted, a nut having a sleeve received by the rod, the nut being threaded onto the adjusting rod, said sleeve having a flange at its free end, the nut and the flange being of greater diameter than the width of the slot in the lug to prevent displacement of the nut from said slot, and a coil spring embracing the adjusting rod and having one end in engagement with the flange on the sleeve, the other end being in engagement with a lug on the band.

JOSEPH MALLIGAN.